US010205420B2

(12) United States Patent
Lee et al.

(10) Patent No.: US 10,205,420 B2
(45) Date of Patent: Feb. 12, 2019

(54) PHOTOVOLTAIC MODULE AND PHOTOVOLTAIC SYSTEM COMPRISING THE SAME

(71) Applicant: LG ELECTRONICS INC., Seoul (KR)

(72) Inventors: Suchang Lee, Seoul (KR); Yong Song, Seoul (KR); Youngchan Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/584,607

(22) Filed: May 2, 2017

(65) Prior Publication Data

US 2017/0317643 A1    Nov. 2, 2017

(30) Foreign Application Priority Data

May 2, 2016 (KR) .................. 10-2016-0053936

(51) Int. Cl.
*H02M 7/48* (2007.01)
*H02S 40/32* (2014.01)
(Continued)

(52) U.S. Cl.
CPC ............. *H02S 40/32* (2014.12); *H02M 1/32* (2013.01); *H02M 3/33507* (2013.01);
(Continued)

(58) Field of Classification Search
CPC ...... H02M 7/5387; H02M 7/48; H02J 3/5383; H02J 5/00; H92M 3/3353; Y10T 307/707; H02S 40/32; H01L 31/0508
(Continued)

(56) References Cited

U.S. PATENT DOCUMENTS 5,485,393 A * 1/1996 Bradford ............. G01R 21/003
                                              324/142
5,493,485 A * 2/1996 Okado ................ H02H 7/1227
                                              363/56.01

(Continued)

FOREIGN PATENT DOCUMENTS

JP    2000-166097 A    6/2000
JP    2012-65391 A     3/2012
(Continued)

*Primary Examiner* — Rajnikant Patel
(74) *Attorney, Agent, or Firm* — Birch, Stewart, Kolasch & Birch, LLP

(57) ABSTRACT

A photovoltaic module and a photovoltaic system including the same are disclosed. The photovoltaic module includes a solar cell module, a converter unit to convert levels of direct current (DC) power from the solar cell module, an inverter unit to convert the DC power into alternating current (AC) power, a cable electrically connected to the inverter unit and to output the AC power to an outside, a communication unit to exchange data with another photovoltaic module, and a controller to control outputting of at least one of phase information and amplitude information of the photovoltaic module for adjusting at least one of a phase and an amplitude of the another photovoltaic module, when the photovoltaic module is set as a master. Consequently, the phase and/or the amplitude of AC power output from another photovoltaic module may be adjusted to be equal.

20 Claims, 13 Drawing Sheets

(51) Int. Cl.
    *H02M 1/32*         (2007.01)
    *H02M 3/335*       (2006.01)
    *H02M 7/5387*     (2007.01)
    *H02M 1/00*         (2006.01)

(52) U.S. Cl.
    CPC ............... *H02M 7/53871* (2013.01); *H02M 2001/0006* (2013.01); *H02M 2001/007* (2013.01); *Y02E 10/50* (2013.01)

(58) Field of Classification Search
    USPC .......... 363/71, 73, 74, 76, 97; 136/244, 246
    See application file for complete search history.

(56) References Cited

U.S. PATENT DOCUMENTS

| | | | |
|---|---|---|---|
| 6,219,341 B1* | 4/2001 | Varanasi | H04J 3/1682 |
| | | | 370/252 |
| 6,791,341 B2* | 9/2004 | Shenai | G01R 19/12 |
| | | | 324/117 H |
| 9,178,429 B2* | 11/2015 | Tian | H02M 3/335 |
| 9,397,609 B2* | 7/2016 | Lee | H02S 40/32 |
| 9,469,262 B2* | 10/2016 | Ido | B60R 16/033 |
| 2013/0155735 A1* | 6/2013 | Ilic | H02M 7/72 |
| | | | 363/71 |

FOREIGN PATENT DOCUMENTS

| | | |
|---|---|---|
| JP | 2016-37816 A | 3/2016 |
| KR | 10-2014-0010217 A | 1/2014 |
| KR | 10-1436092 B1 | 9/2014 |

\* cited by examiner

PHOTOVOLTAIC MODULE AND PHOTOVOLTAIC SYSTEM COMPRISING THE SAME

CROSS-REFERENCE TO RELATED APPLICATION

This application claims the priority benefit of Korean Patent Application No. 10-2016-0053936, filed on May 2, 2016 in the Korean Intellectual Property Office, the disclosure of which is incorporated herein by reference.

BACKGROUND OF THE INVENTION

1. Field of the Invention

Embodiments of the present invention relate to a photovoltaic module and a photovoltaic system including the same, and more particularly, to a photovoltaic module and a photovoltaic system, in which the phase or amplitude of alternating current (AC) power output from other photovoltaic module may be adjusted to be equal.

2. Description of the Related Art

Recently, as existing energy resources, such as oil and coal, are predicted to be depleted, there has been an increasing interest in alternative energy resources to replace the existing energy resources. Among the alternative energy resources, solar cells, which directly convert solar energy into electrical energy by using a semiconductor device, has received attention as a next-generation cell.

The photovoltaic module may convert direct current (DC) power, generated by a solar cell, into alternating current (AC) power, and may output the AC power.

Specifically, a plurality of photovoltaic modules may be connected in parallel, such that AC power of each photovoltaic module may be output to the outside.

In this instance, the phase or amplitude of AC power output from the plurality of photovoltaic modules is required to be equal for stable output of AC power.

SUMMARY OF THE INVENTION

It is an object of the present invention to provide a photovoltaic module and a photovoltaic system including the same, in which the phase or amplitude of an alternating current power output from other photovoltaic module may be adjusted to be equal.

In accordance with an aspect of the present invention, the above and other objects can be accomplished by the provision of a photovoltaic module including a solar cell module, a converter unit to convert levels of direct current (DC) power from the solar cell module, an inverter unit to convert the DC power into alternating current (AC) power, a cable electrically connected to the inverter unit and to output the AC power to an outside, a communication unit to exchange data with another photovoltaic module, and a controller to control outputting of at least one of phase information and amplitude information of the photovoltaic module for adjusting at least one of a phase and an amplitude of the another photovoltaic module.

In accordance with another aspect of the present invention, there is provided a photovoltaic system including a plurality of photovoltaic modules, each including a solar cell module, and an inverter unit to convert direct current (DC) power of the solar cell module into alternating current (AC) power and output the AC power, and a plurality of cables, each electrically connected to the plurality of photovoltaic modules, and to output the AC power to an outside, wherein in response to a first photovoltaic module, among the plurality of photovoltaic modules, being set as a master, the first photovoltaic module outputs at least one of phase information and amplitude information for adjusting at least one of a phase and an amplitude of another photovoltaic module.

DETAILED DESCRIPTION OF THE PREFERRED EMBODIMENTS

Hereinafter, embodiments of the present invention will be described in detail with reference to the accompanying drawings.

In the following description, the terms "module" and "unit", which are used herein to signify components, are merely intended to facilitate explanation of the present invention, and the terms do not have any distinguishable difference in meaning or role. Thus, the terms "module" and "unit" may be used interchangeably.

Figure 1:
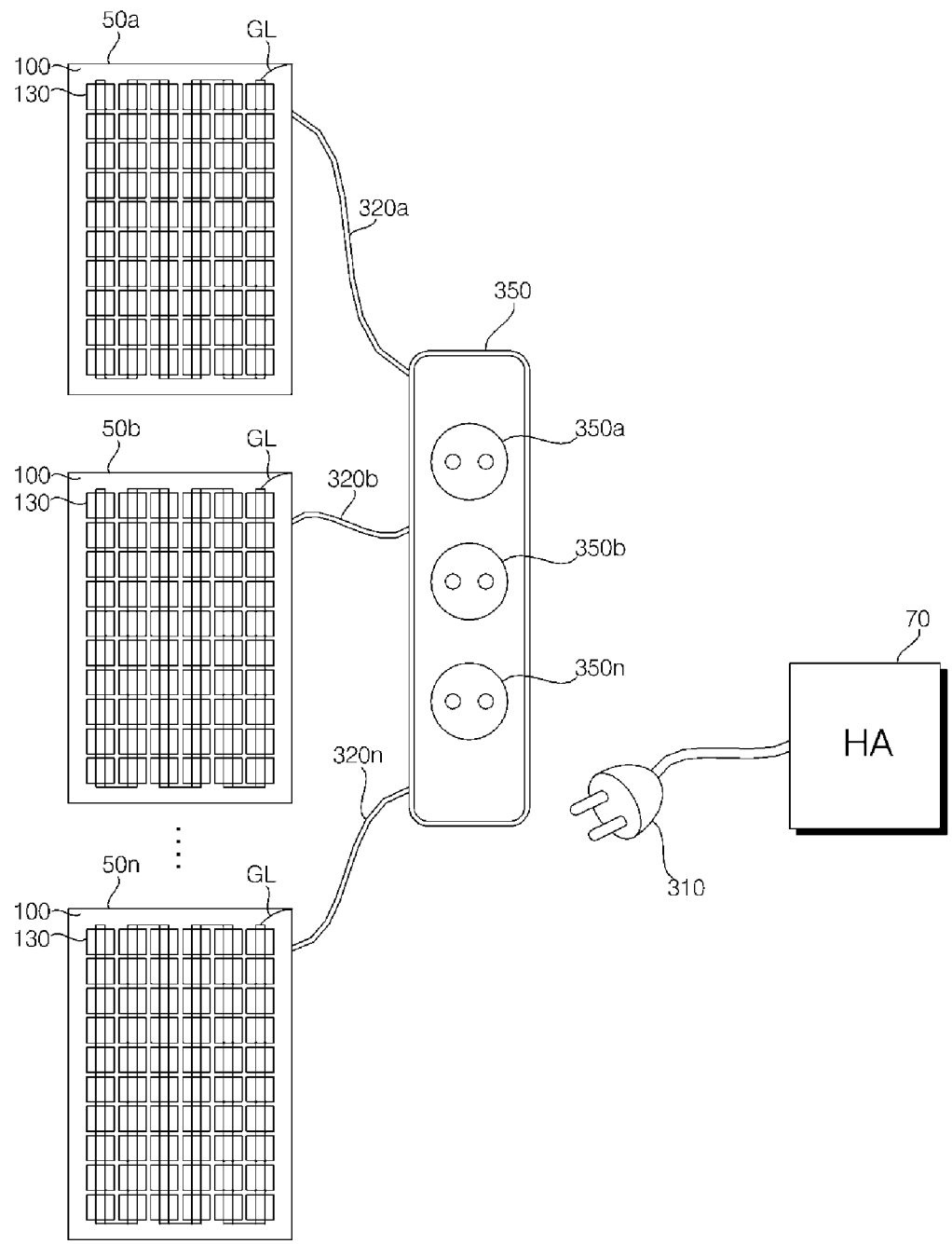
FIG. 1 is a view showing a photovoltaic system according to an example embodiment of the present invention.

FIG. 1 is a view showing a photovoltaic system according to an example embodiment of the present invention.

Referring to FIG. 1, the photovoltaic system 10 according to the present invention comprises: a plurality of photovoltaic modules 50a, 50b, . . . , and 50n, which output alternating current (AC) power, and a plurality of cables 320a, 320b, . . . , and 320n, which are electrically connected to the plurality of photovoltaic modules 50a, 50b, . . . , and 50n respectively, and output AC power to the outside.

The photovoltaic system 10 is electrically connected to the plurality of cables 320a, 320b, . . . , and 320n, and may further comprise an outlet, to which a plug 310 of a home appliance (or an electric device) 70 may be connected.

FIG. 1 illustrates an example where the plurality of photovoltaic modules 50a, 50b, . . . , and 50n are connected in parallel to an outlet through the plurality of cables 320a, 320b, . . . , and 320n.

In this instance, it is desired to adjust at least one of the phase or the amplitude of AC power to be equal, which is output from the plurality of photovoltaic modules 50a, 50b, ..., and 50n. Particularly, it is desired to adjust the phase of AC power to be equal.

To this end, in the present invention, without any need of control by an external device, any one of the plurality of photovoltaic modules 50a, 50b, ..., and 50n is set as a master, and the others are set as slaves, and based on the phase and amplitude of a photovoltaic module set as a master, the phase and amplitude of other photovoltaic modules are adjusted.

For example, in the instance where a first photovoltaic module 50a is set as a master among the plurality of photovoltaic modules 50a, 50b, ..., and 50n, the first photovoltaic module 50a may output at least one of the phase information or the amplitude information for adjusting the phase and amplitude of other photovoltaic modules 50b, ..., and 50n.

In this manner, without any need of a separate external device, the photovoltaic module itself may adjust the phase or amplitude of other photovoltaic modules. Particularly, the phase or amplitude of other photovoltaic modules may be adjusted according to the phase or amplitude of the first photovoltaic module.

Examples of the home appliance 70 may comprise home electrical appliances, such as a washing machine, a refrigerator, an air-conditioner, an air purifier, and a cooker, and various other devices, such as TV.

As illustrated in FIG. 1, an outlet is further comprised, to which the plug 310 of the home appliance 70 may be connected, such that AC power may be directly supplied to the home appliance 70 independently of a grid. Accordingly, the AC power may be used not only inside but also outside the buildings.

The plurality of photovoltaic modules 50a, 50b, ..., and 50n each comprise solar cell modules 100a, 100b, ..., and 100n, and junction boxes 200a, 200b, ..., and 200n which are attached to a rear surface of the solar cell modules 100a, 100b, ..., and 100n, and output AC power.

Hereinafter, description will be made based on a single photovoltaic module.

The photovoltaic module 50 comprises the solar cell module 100 and the junction box 200 positioned on a rear surface of the solar cell module 100. Further, the photovoltaic module 50 may further comprise a heat releasing member interposed between the solar cell module 100 and the junction box 200.

The solar cell module 100 comprises a plurality of solar cells 130.

The solar cell 130 is a semiconductor device which converts solar energy into electrical energy, and examples thereof comprise a silicon solar cell, a compound semiconductor solar cell, a tandem solar cell, a Dye-sensitized solar cell, a CdTe solar cell, a CIGS solar cell, and the like.

The solar cells 130 may be electrically connected in parallel or in series, or connected in a serial-parallel manner.

In FIG. 1, ten solar cells 130 are connected to one string, and six strings in total are connected in series with each other, but the connection is not limited thereto and various modifications may be made.

A ground line (GL) of the solar cell module may be electrically connected to any one string of the plurality of strings to provide ground connection to direct current (DC) power from the solar cell.

The GL of the solar cell module may be electrically connected to a frame 105 of the solar cell module 100, in which the frame 105 is a conductive member.

Figure 2:
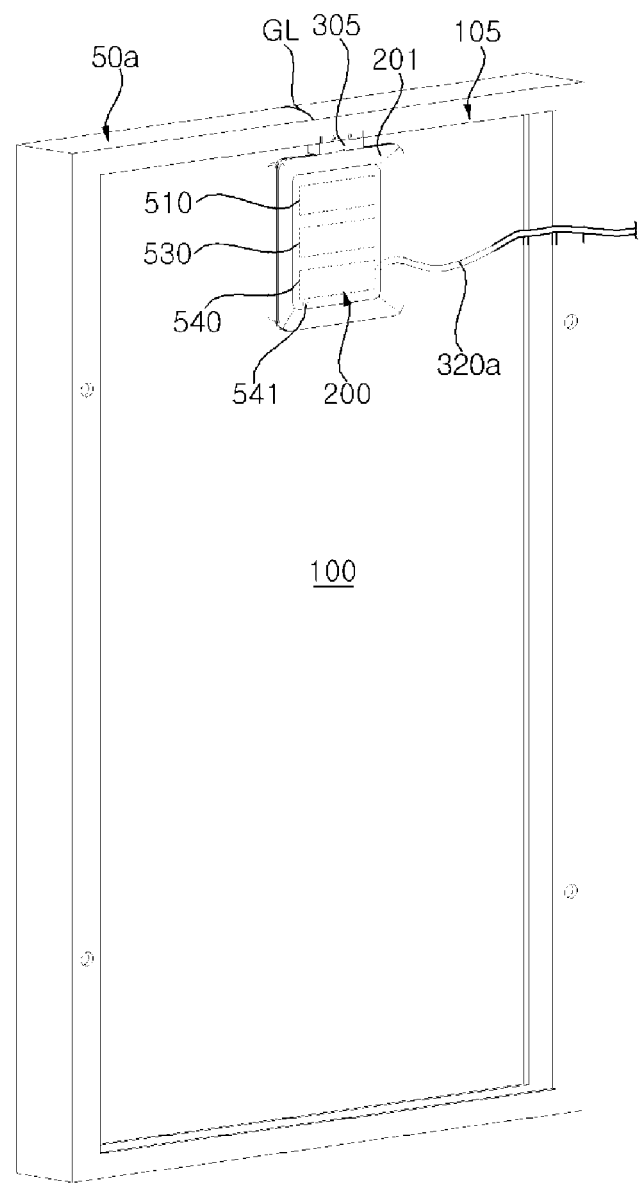
FIG. 2 is a rear view of a first photovoltaic module illustrated in FIG. 1.

FIG. 2 illustrates an example where the GL of the solar cell module is extended to a rear surface of the solar cell module 100, such that the GL may be electrically connected to the frame 105 formed on the rear surface of the solar cell module 100.

FIG. 2 is a rear view of a first photovoltaic module illustrated in FIG. 1.

Referring to FIG. 2, the junction box 200 and the cable 320a may be disposed on a rear surface of the first photovoltaic module 100a.

In FIG. 2, a ground terminal 541 of an inverter unit 540 may be connected to a frame 201 of the junction box 200, in which the frame 201 is a conductive member.

Further, the frame 201 of the junction box 200 may be electrically connected with the frame 105 of the solar cell module 100 through a conductive member 305.

In this instance, the GL of the solar cell module 100 may be electrically connected to a ground terminal 310a of the plug 300 through the frame 105 of the solar cell module 100, the frame 201 of the junction box 200, and the ground terminal 541 of the inverter unit 540.

In this manner, there is no need to provide a separate ground line to be connected to the ground line (GL) of the solar cell module.

The junction box 200 comprises a bypass diode 510, a converter unit 530, and an inverter unit 540, which will be described later with reference to FIG. 11.

Figure 3A:
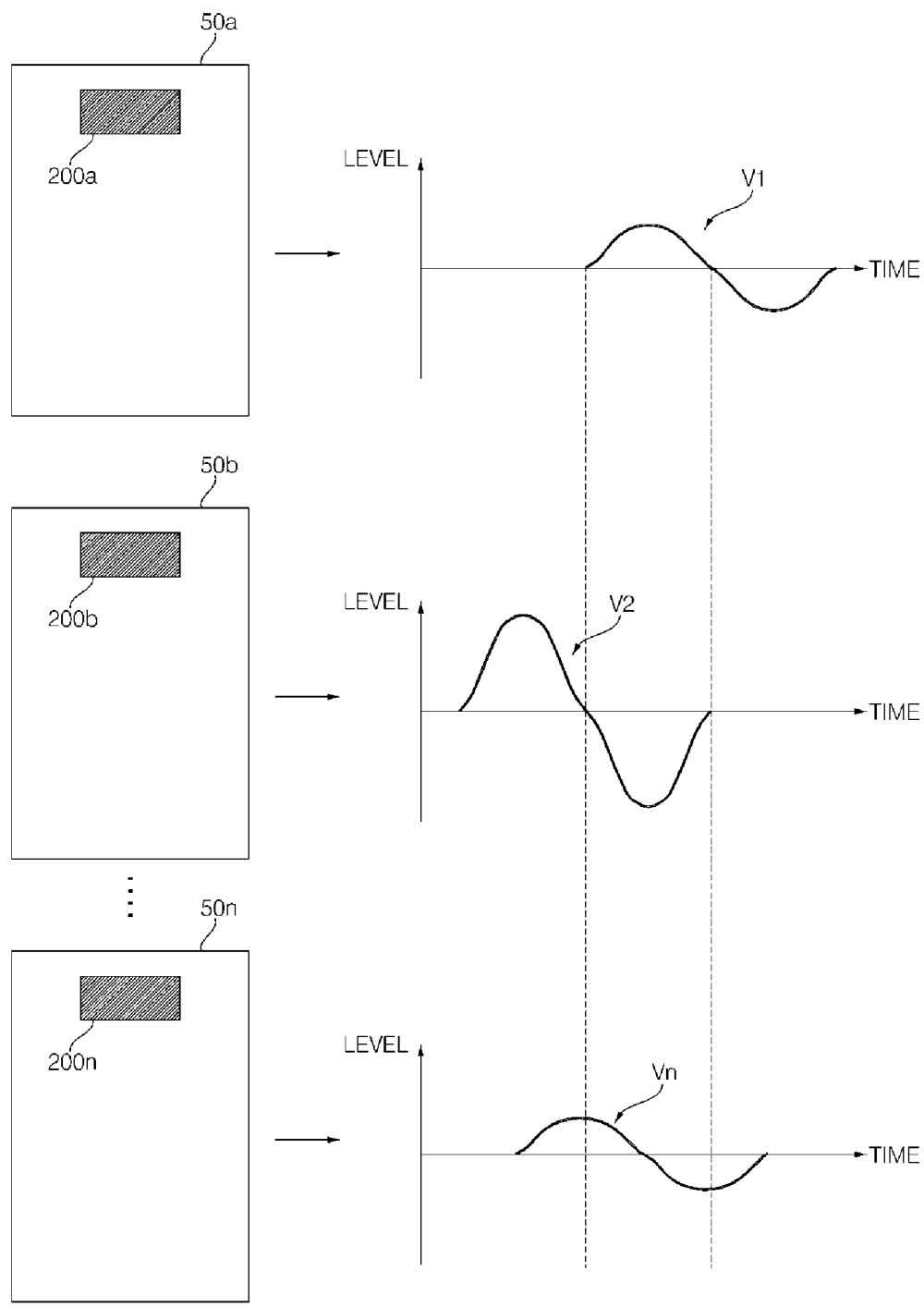
FIGS. 3A and 3B are diagrams showing waveforms of alternating current (AC) power output from a plurality of photovoltaic modules illustrated in FIG. 1.
Figure 3B:
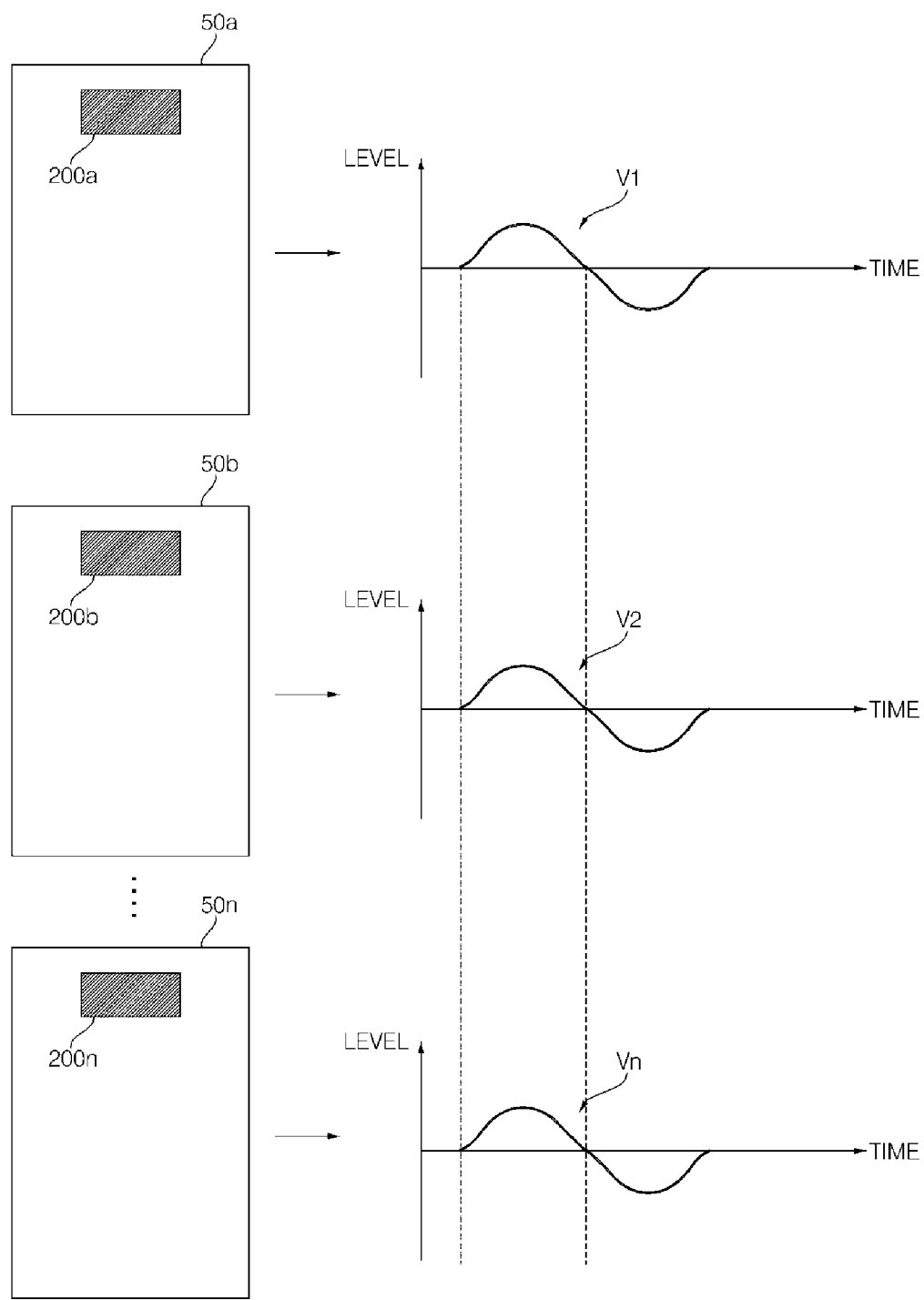

FIGS. 3A and 3B are diagrams showing waveforms of alternating current (AC) power output from a plurality of photovoltaic modules illustrated in FIG. 1.

First, referring to FIG. 3A, the plurality of photovoltaic modules 50a, 50b, ..., and 50n may output AC voltage waveforms V1, V2, ..., and Vn having different phases and amplitudes.

As illustrated in FIG. 3A, in the instance where AC voltage waveforms, with different amplitudes and phases, are provided to the outlet 350 of FIG. 1, a voltage waveform is output, which is totally different from the grid's AC voltage waveform. In this instance, the home appliance 70 may not operate stably.

Then, referring to FIG. 3B, the plurality of photovoltaic modules 50a, 50b, ..., and 50n may output AC voltage waveforms V1, V2, ..., and Vn having an identical amplitude and phase, thereby providing stable AC voltage waveforms to the outlet 350 of FIG. 1.

In order to provide the AC voltage waveforms V1, V2, ..., and Vn having an identical amplitude and phase, as illustrated in FIG. 3B, it is desired that the first photovoltaic module 50a is set as a master among the plurality of photovoltaic modules 50a, 50b, ..., and 50n, and the other photovoltaic modules are set as slaves.

Figure 4:
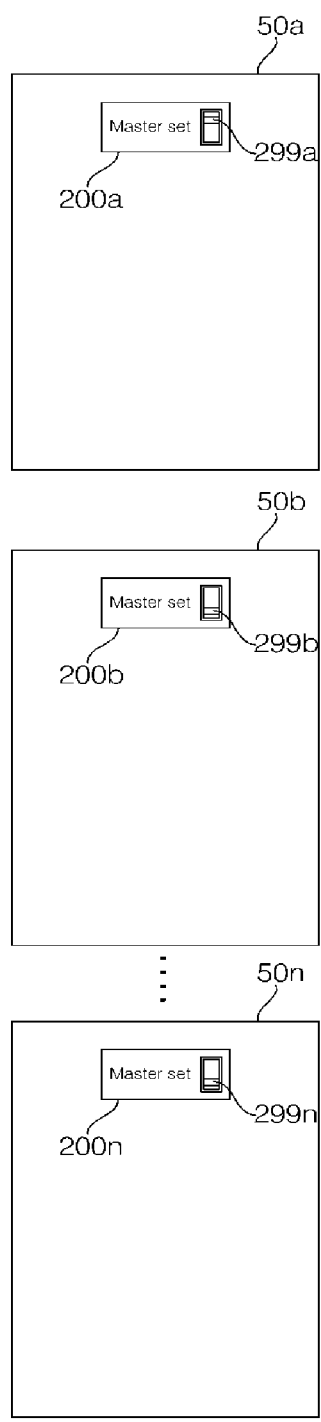
FIG. 4 is a rear view of the plurality of photovoltaic modules illustrated in FIG. 1.

FIG. 4 is a rear view of the plurality of photovoltaic modules illustrated in FIG. 1.

Referring to FIG. 4, the plurality of photovoltaic modules 50a, 50b, ..., and 50n each may comprise operation units 299a, 299b, ..., and 299n for setting of a master or slave.

The operation units 299a, 299b, ..., and 299n may be disposed on the outside of the junction boxes 200a, 200b, ..., and 200n, and may operate an operation button to set a master or a slave.

For example, in the instance where the operation button is lifted up, a master is set, while in the instance where the operation button is lowered, a slave is set.

In FIG. 4, an operation button of the operation unit 299a of the first photovoltaic module 50a is lifted up, and accordingly, the first photovoltaic module 50a is set as a master.

Further, in FIG. 4, operation buttons of the operation units 299b, . . . , and 299n of other photovoltaic modules 50b, . . . , and 50n are lowered, and accordingly, the other photovoltaic modules 50b, . . . , and 50n are set as slaves.

In the instance where the first photovoltaic module 50a is set as a master among the plurality of photovoltaic modules 50a, 50b, . . . , and 50n, the first photovoltaic module 50a may output at least one of phase information or amplitude information for adjusting the phase and amplitude of the other photovoltaic modules 50b, . . . , and 50n.

In the instance where the second photovoltaic module 50b is set as a slave among the plurality of photovoltaic modules 50a, 50b, . . . , and 50n, the second photovoltaic module 50b may shift at least one of the phase or amplitude of the output AC power, based on the phase information or the amplitude information received from the first photovoltaic module 50a.

In the instance where the other photovoltaic modules 50b, . . . , and 50n are set as slaves among the plurality of photovoltaic modules 50a, 50b, . . . , and 50n, the other photovoltaic modules 50b, . . . , and 50n may adjust at least one of the phase or amplitude of the output AC power, based on at least one of the phase information or the amplitude information received from the first photovoltaic module 50a.

Accordingly, at least one of the phase or the amplitude of AC power output from all the photovoltaic modules 50a, 50b, . . . , and 50n may be equal.

The first photovoltaic module 50a may comprise a communication unit 580 which may output to the outside at least one of the phase or the amplitude.

The communication unit 580 of the first photovoltaic module 50a may receive current information or voltage information of other photovoltaic modules 50b, . . . , and 50n, and based on the received information, the communication unit 580 may output at least one of the phase information or the amplitude information to the other photovoltaic modules 50b, . . . , and 50n.

Further, other photovoltaic modules 50b, . . . , and 50n may comprise a communication unit to receive at least one of the phase information or amplitude information from the first photovoltaic module 50a.

Figure 5:
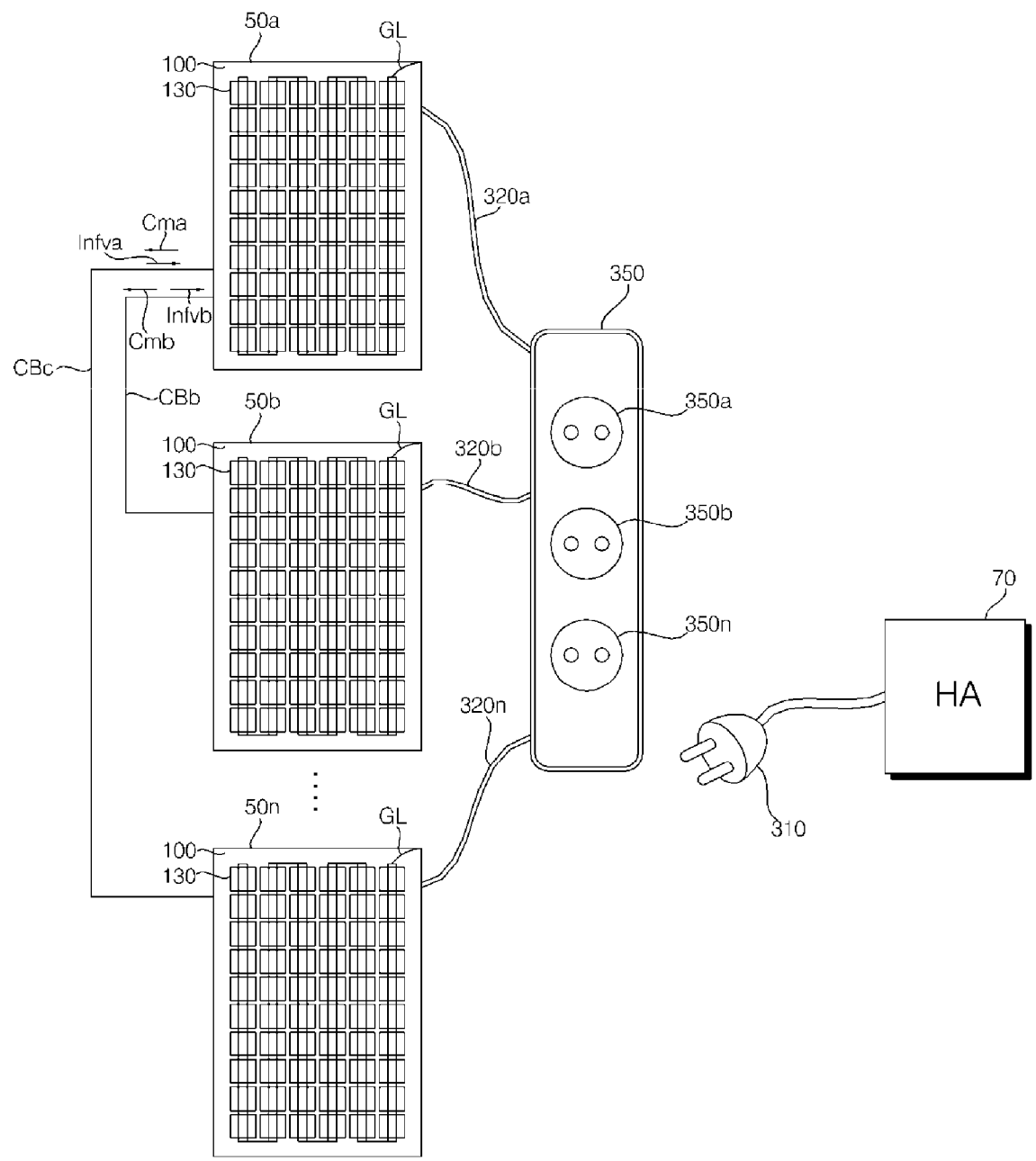
FIG. 5 is a view showing a signal flow among the plurality of photovoltaic modules illustrated in FIG. 1.

FIG. 5 is a view showing a signal flow among the plurality of photovoltaic modules illustrated in FIG. 1.

Referring to FIG. 5, the first photovoltaic module 50a, which is set as a master, may receive current information and voltage information (Infva, Infvb) from other photovoltaic modules 50b, . . . , and 50n.

The first photovoltaic module 50a, which is set as a master, may output at least one of the phase information or the amplitude information (Cma, Cmb) to the other photovoltaic modules 50b, . . . , and 50n.

Each photovoltaic module 50 comprises: a converter unit 530 to convert levels of direct current (DC) power from the solar cell module 100, an inverter unit 540, a converter output current detector C to detect a current output from the converter unit 530, a converter output voltage detector D to detect a voltage output from the converter unit 530, and a controller 550 to control the operation of the converter unit 530 and the inverter unit 540.

Further, in the instance where a current or voltage output from the converter unit 530 is lower than a reference lower limit level or higher than a reference upper limit level, the controller 550 may output an operation-off command to the inverter unit 540, which will be described below with reference to FIG. 6.

Figure 6:
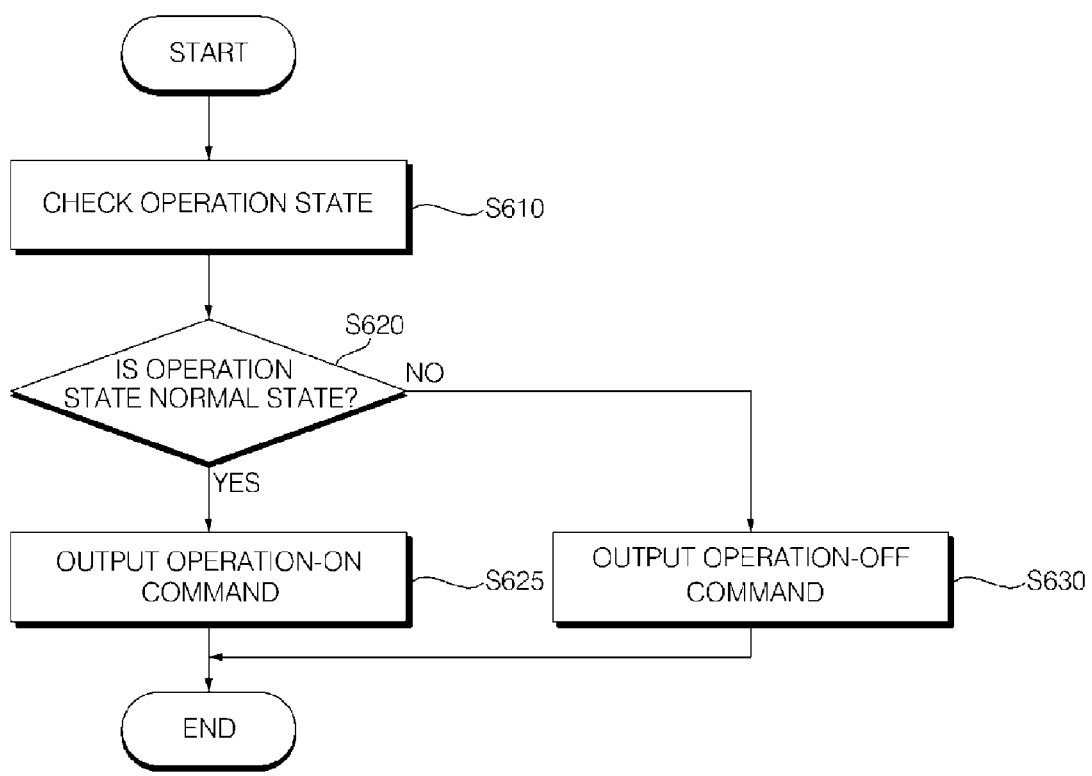
FIG. 6 is a flowchart showing a method of operating a photovoltaic module according to an example embodiment of the present invention.

FIG. 6 is a flowchart showing a method of operating a photovoltaic module according to an example embodiment of the present invention.

Referring to FIG. 6, the controller 550 may check an operation state of the photovoltaic module 50 in S610, based on a converter output current detected by the converter output current detector C and a converter output voltage detected by the converter output voltage detector D, and the like.

Subsequently, in the instance where an operation state of the photovoltaic module 50 is a normal state, the controller 550 may output an operation-on command in S625. For example, the controller 550 may output a converter switching control signal to the converter unit 530, or may output an inverter switching control signal to the inverter unit 540.

Here, the normal state may refer to a state where the current or the voltage output from the converter unit 530 is between the reference lower limit level and the reference upper limit level.

Then, in the instance where an operation state of the photovoltaic module 50 is not a normal state, the controller 550 may output an operation-off command in S630.

For example, in the instance where the current or the voltage output from the converter 530 is lower than the reference lower limit level or higher than the reference higher limit level, the controller 550 may output an operation-off command for the inverter unit 540.

In response to the operation-off command, the inverter unit 540 stops a switching operation, thereby preventing burning of a circuit device in the photovoltaic module 50.

In the instance where an operation-off command is given to the first photovoltaic module 50a set as a master, the operation-off command may be transmitted to other photovoltaic modules 50b, . . . , and 50n through the communication unit 580, thereby protecting the other photovoltaic modules 50b, . . . , and 50n.

Figure 7:
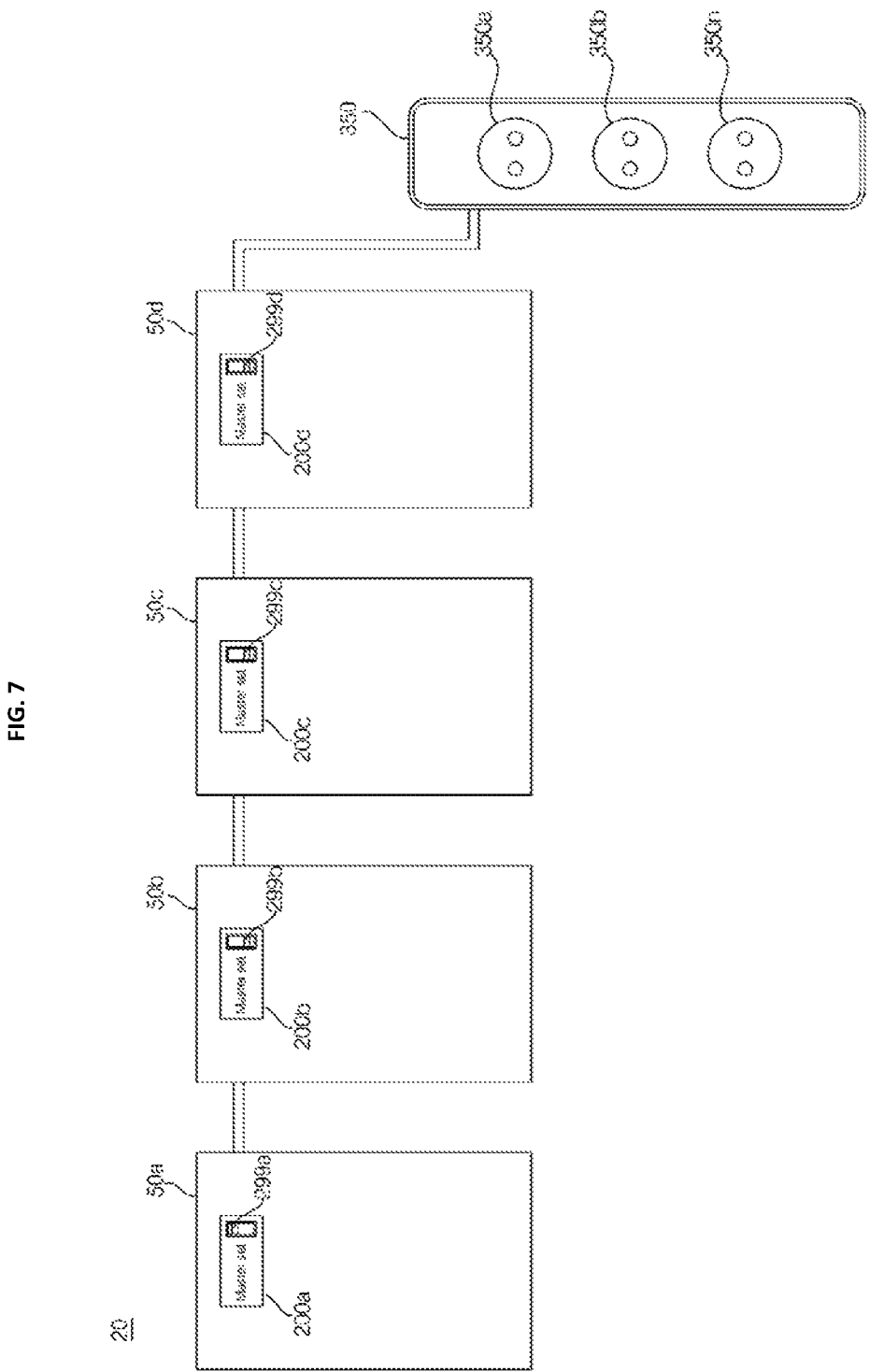
FIG. 7 is a view showing a photovoltaic system according to another example embodiment of the present invention.

FIG. 7 is a view showing a photovoltaic system according to another example embodiment of the present invention.

The photovoltaic system 20 illustrated in FIG. 7 comprises four photovoltaic modules 50a to 50d, among which the first photovoltaic module 50a is set as a master and other three photovoltaic modules 50b to 50d are set as slaves.

As illustrated in FIG. 7, an outlet 350 may be electrically connected to a cable, to which the fourth photovoltaic module 50d is connected, thereby connecting the plug of a home appliance.

The four photovoltaic modules 50a to 50d may be connected in parallel with each other.

Figure 8:
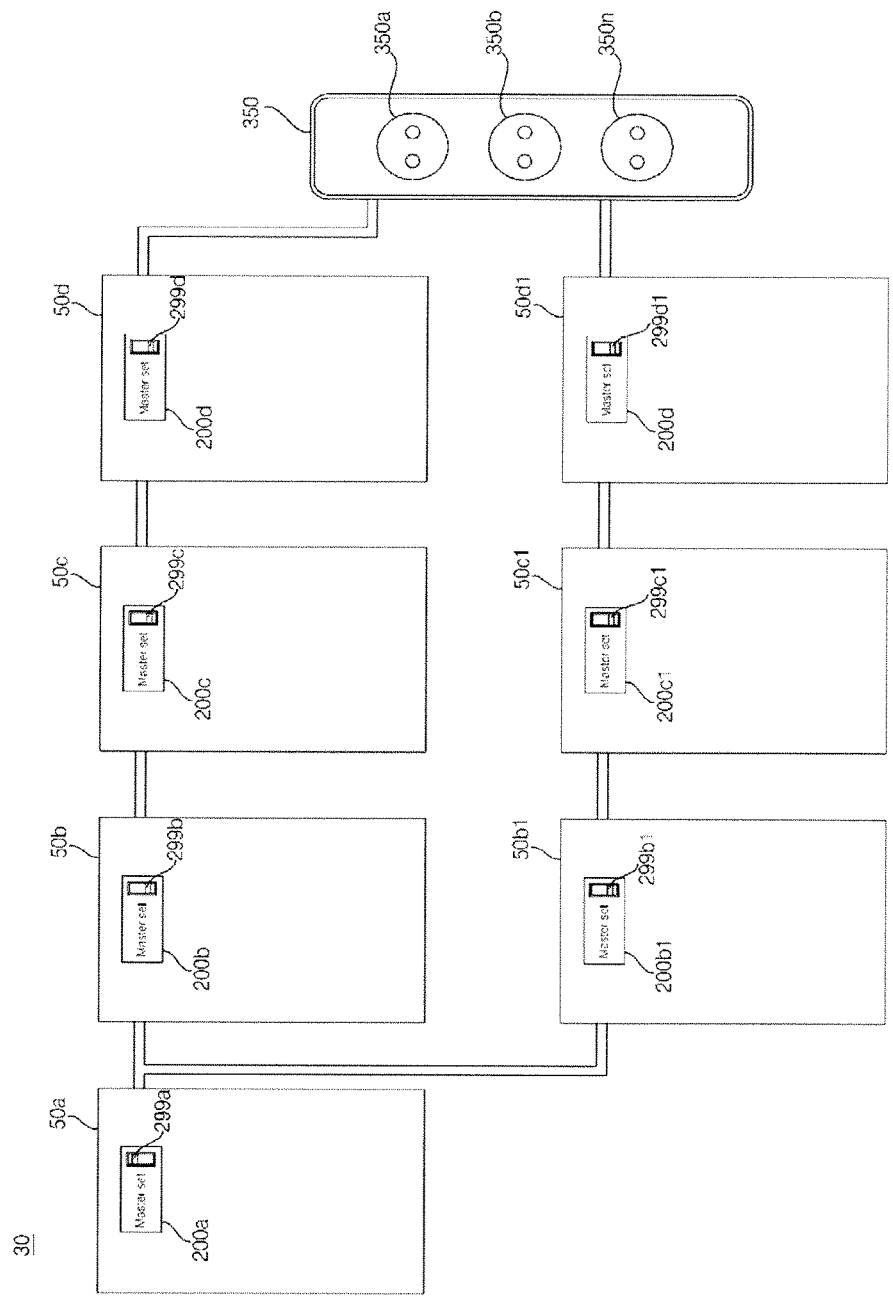
FIG. 8 is view showing a photovoltaic system according to yet another example embodiment of the present invention.

FIG. 8 is view showing a photovoltaic system according to yet another example embodiment of the present invention.

The photovoltaic system 30 illustrated in FIG. 8 comprises seven photovoltaic modules 50a to 50d and 50b1 to 50d1, among which the first photovoltaic module 50a is set as a master and other six photovoltaic modules 50b to 50d and 50b1 to 50d1 are set as slaves.

As illustrated in FIG. 8, the outlet 350 may be electrically connected to a cable, to which the fourth photovoltaic module 50d and the seventh photovoltaic module 50d1 are connected, thereby connecting the plug of a home appliance.

The seven photovoltaic modules 50a to 50d and 50b1 to 50d1 may be connected in parallel with each other.

Figure 9:
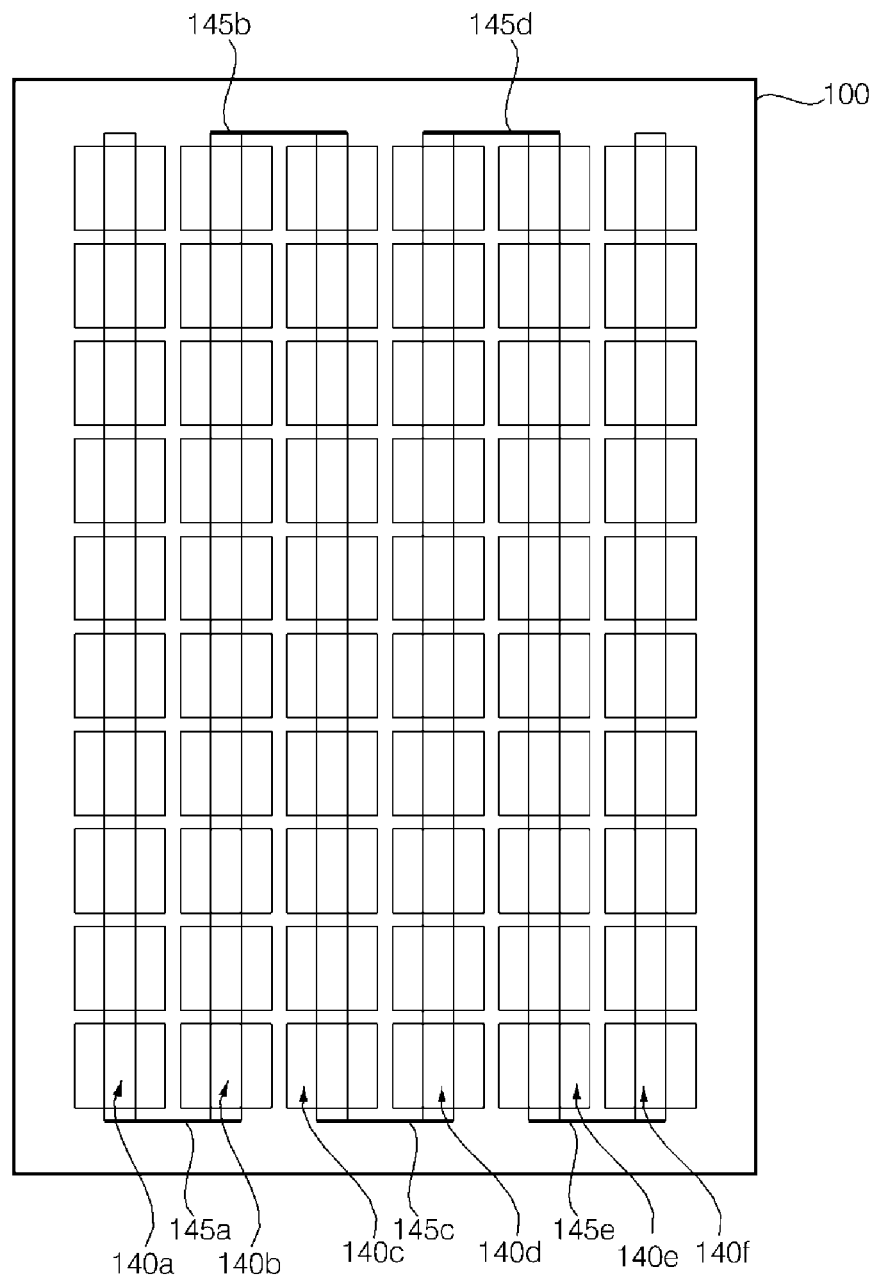
FIG. 9 is a front view of a photovoltaic module according to an example embodiment of the present invention.
Figure 10:
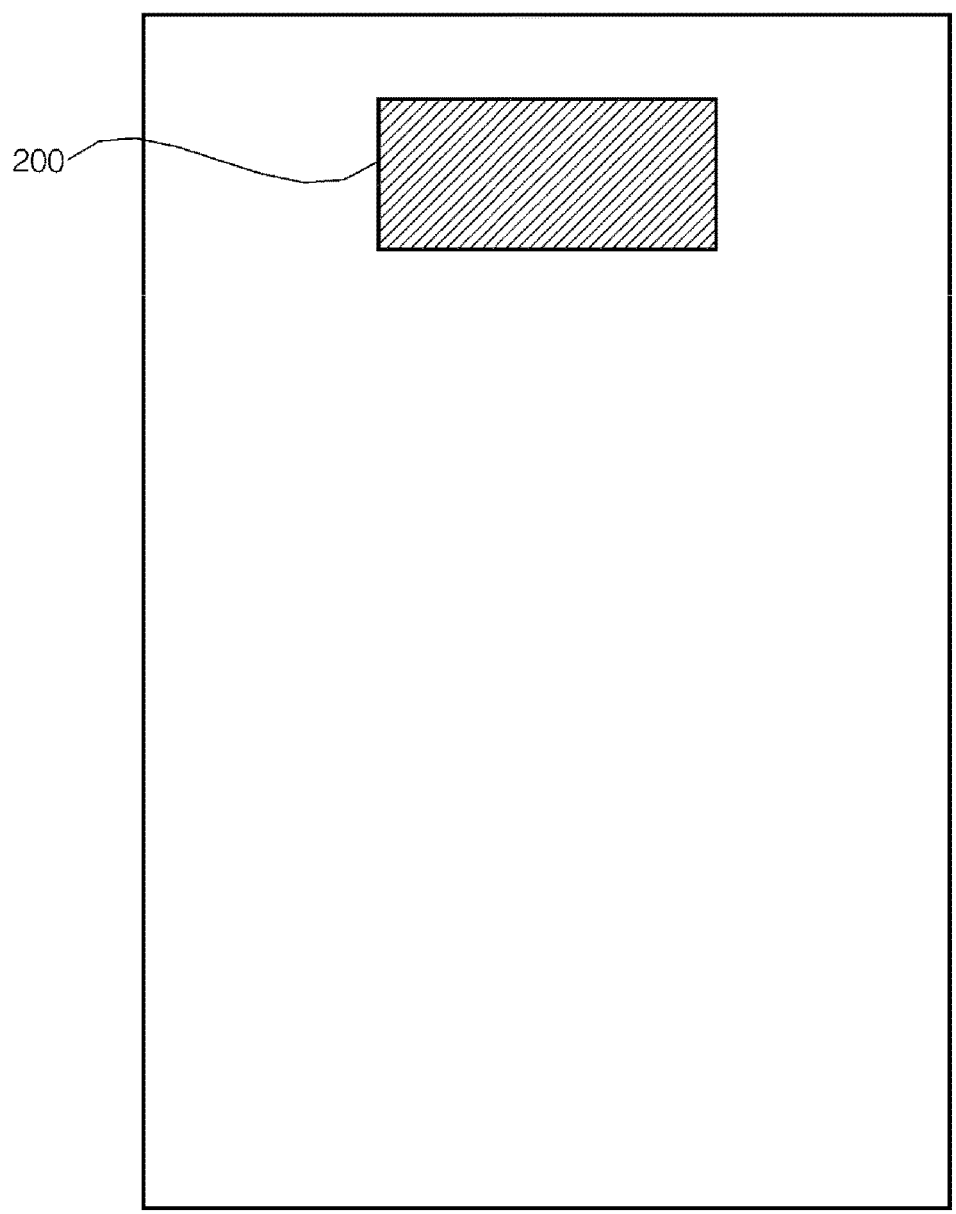
FIG. 10 is a rear view of the photovoltaic module illustrated in FIG. 9.

FIG. 9 is a front view of a photovoltaic module according to an example embodiment of the present invention, and FIG. 10 is a rear view of the photovoltaic module illustrated in FIG. 9.

Referring to FIGS. 9 and 10, the photovoltaic module according to the present invention comprises: the solar cell module 100, and the junction box 200 positioned on a rear surface of the solar cell module 100.

The junction box 200 may comprise at least one bypass diode which performs a bypassing operation to prevent the occurrence of a hot spot when a shade appears.

Figure 11:
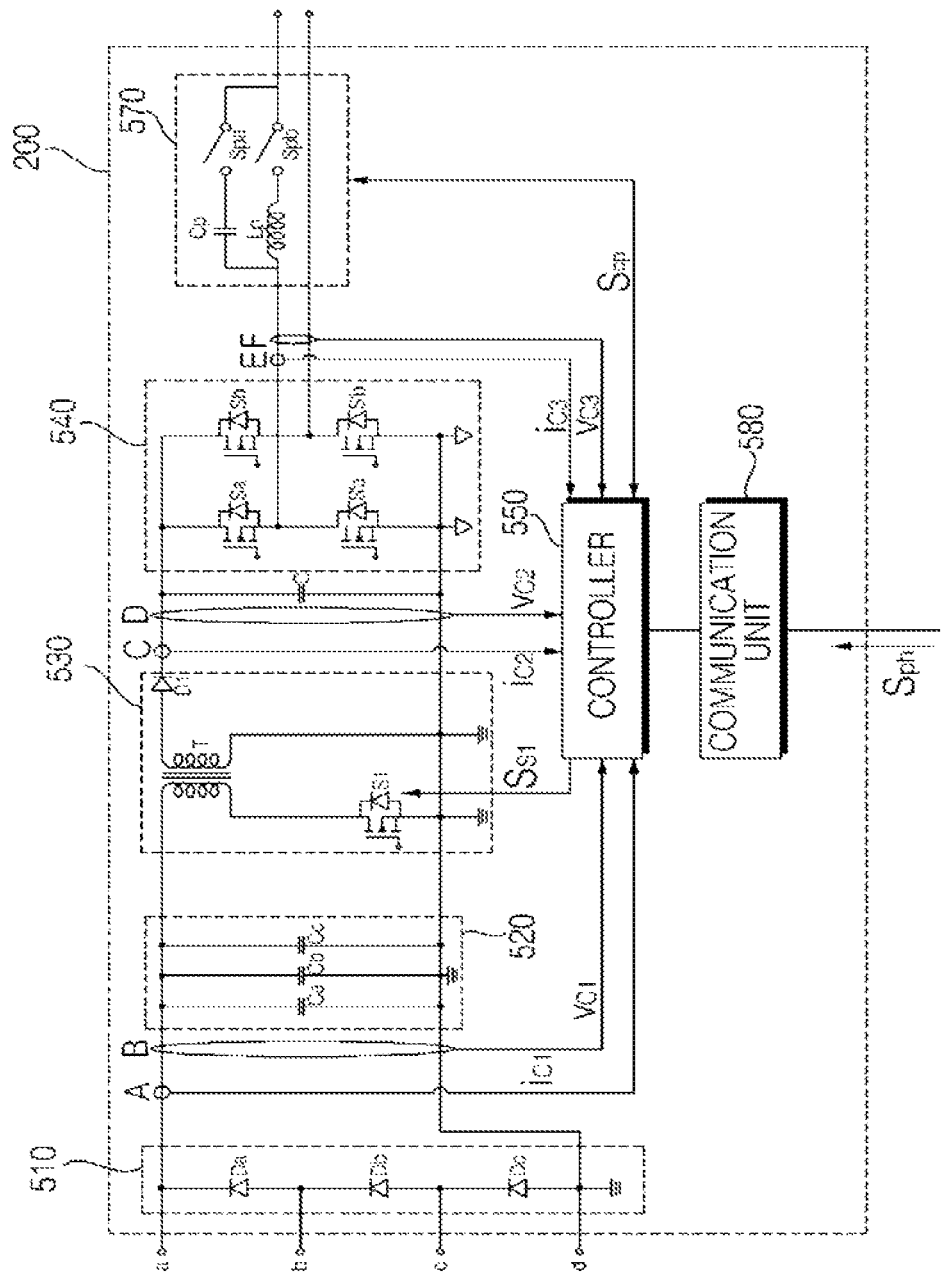
FIG. 11 is an internal circuit diagram of an example of a junction box illustrated in FIG. 10.

As compared to four solar cell strings in FIG. 9, three bypass diodes Da, Db, and Dc (in FIG. 11) are illustrated in the drawings comprising FIG. 11.

The junction box 200 may convert DC power supplied by the solar cell module 100, which will be described later with reference to FIG. 11.

The solar cell module 100 may comprise a plurality of solar cells.

In the drawings, a plurality of solar cells are connected in a line by ribbons 133 (in FIG. 12), thereby forming solar cell strings 140. In this instance, six strings 140a, 140b, 140c, 140d, 140e, and 140f are formed, and each string comprises ten solar cells. However, various modifications may be made in a different manner from the drawings.

The respective solar cell strings may be electrically connected by bus ribbons. FIG. 9 illustrates an example where the first solar cell string 140a and the second solar cell string 140b are electrically connected, the third solar cell string 140c and the fourth solar cell string 140d are electrically connected, and the fifth solar cell string 140e and the sixth solar cell string 140f are electrically connected, by the respective bus ribbons 145a, 145c, and 145e disposed at a lower portion of the solar cell module 100.

Further, FIG. 9 also illustrates an example where the second solar cell string 140b and the third solar cell string 140c are electrically connected, and the fourth solar cell string 140d and the fifth solar cell string 140e are electrically connected, by the respective bus ribbons 145b and 145d disposed at an upper portion of the solar cell module 100.

The ribbon connected to the first string, the bus ribbons 145b and 145d, and the ribbon connected to the sixth string are electrically connected to the first to fourth conductive lines, respectively, and the first to fourth conductive lines are connected with the bypass diodes Da, Db, and Dc (in FIG. 11) within the junction box 200 disposed on the rear surface of the solar cell module 100. In the drawing, the first to fourth conductive lines are extended to the rear surface of the solar cell module 100 through openings formed on the solar cell module 100.

Between two end portions of the solar cell module 100, it is desired that the junction box 200 is disposed closer to an end portion where the conductive lines are extended.

FIG. 11 is an internal circuit diagram of an example of a junction box illustrated in FIG. 10.

Referring to FIG. 11, the junction box 200 may convert DC power from the solar cell module 100, and may output the converted power.

Particularly, in embodiments of the present invention, the junction box 200 may output alternating current (AC) power.

To this end, the junction box 200 may comprise the converter unit 530, the inverter unit 540, and the controller 550 to control the converter unit 530 and the inverter unit 540.

Further, the junction box 200 may further comprise a bypass diode 510 for bypassing, and a capacitor 520 for storing DC power.

In addition, the junction box 200 may further comprise the communication unit 580 for communication with an external gateway or other photovoltaic modules 50b, 50c, . . . , and 50n.

The junction box 200 may further comprise a phase shifting unit 570 to shift the phase of the output AC power based on a phase changing signal generated by the gateway or other photovoltaic modules 50a, 50b, 50c, . . . , and 50n.

The phase shifting part 570 comprises a plurality of passive devices, and based on at least some of the plurality of passive devices, the phase shifting part 570 may adjust a phase difference between an AC current io and an AC voltage vo which are output from the inverter unit 540.

For example, as illustrated in FIG. 11, the phase shifting unit 570 may comprise: a capacitor CP, a first switching device Spa which is connected in series with the capacitor CP, an inductor Lp which is connected in parallel with the capacitor CP or the first passive device Spa, and a second switching device Spb which is connected in series with the inductor Lp.

The controller 550 may output a switching control signal Scp to the phase switching part 570 to control the operation of the first switching device Spa and the second switching device Spb based on a phase switching signal Sph generated by the gateway or other photovoltaic modules 50a, 50b, 50c, . . . , and 50n.

For example, based on a phase switching signal Sph, which comprises a phase advancing signal, from the gateway or the photovoltaic modules 50a, 50b, 50c, . . . , and 50n, the controller 550 may control the first switching device Spa to be turned on and the second switching device Spb to be turned off.

In another example, based on a phase switching signal Sph, which comprises a phase delay signal, from the gateway or the photovoltaic modules 50a, 50b, 50c, . . . , and 50n, the controller 550 may control the first switching device Spa to be turned off and the second switching device Spb to be turned on.

The junction box 200 may further comprise: an input current detector A, an input voltage detector B, a converter output current detector C, a converter output voltage detector D, an inverter output current detector E, and an inverter output voltage detector F.

The controller 550 may control the converter unit 530 and the inverter unit 540.

The bypass diode unit 510 may comprise bypass diodes Dc, Db, and Da, each of which is interposed between the first to fourth conductive lines of the solar cell module 100. The bypass diode is one or more in number, and it is desired that the number of the bypass diodes is one less than the number of the conductive lines.

The bypass diodes Dc, Db, and Da receives input of solar DC power from the solar cell module 100, particularly from the first to fourth conductive lines of the solar cell module 100. In addition, the bypass diodes Dc, Db, and Da may perform a bypassing operation when inverse voltage occurs in at least one of the first to fourth conductive lines.

The DC power, after passing through the bypass diode unit 510 may be input to the capacitor unit 520.

The capacitor unit 520 may store DC power input after passing through the solar cell module 100 and the bypass diode unit 550.

In FIG. 11, the capacitor unit 520 comprises a plurality of capacitors Ca, Cb, and Cc which are connected in parallel with each other. However, the plurality of capacitors may be connected in a serial-parallel manner, or may be connected in series with a ground terminal. Alternatively, the capacitor unit 520 may comprise a single capacitor.

The converter 530 may convert a level of voltage input from the solar cell module 100 after passing through the bypass diode unit 510 and the capacitor unit 520.

Particularly, the converter unit 530 may perform power conversion by using DC power stored in the capacitor unit 520.

For example, the converter unit 530 comprises a plurality of resistor elements or transformers, and may distribute input voltage according to a set voltage target.

In FIG. 11, although a tap inductor converter is illustrated as an example of the converter unit 530, a flyback converter, a buck converter, a boost converter, and the like may also be used as the converter unit 530.

The converter unit 530 illustrated in FIG. 11, i.e., a tap inductor converter, may comprise a tap inductor T, a switching device S1 connected between the tap inductor T and a ground end, and a diode D1 connected to an output end of the tap inductor T to perform electric conduction in one direction.

In addition, the DC end capacitor may be connected between an output end, i.e., a cathode, of the diode D1 and the ground end.

Specifically, the switching device S1 may be connected between a tap of the tap inductor T and the ground end. Further, an output end (a secondary side) of the tap inductor T is connected to an anode of the diode D1, and the DC end capacitor C1 is connected between the cathode of the diode D1 and the ground end.

The primary side and the secondary side of the tap inductor T have opposite polarities. For this reason, the Tap inductor T may be referred to as a switching transformer.

The switching device S1 may be turned on and off based on a converter switching control signal from the controller 550, such that a level-converted DC power may be output.

The inverter unit 540 may convert the DC power, level-converted by the converter unit 530, into AC power.

FIG. 11 illustrates a full-bridge inverter. That is, upper arm switching devices Sa and Sb and lower arm switching devices S'a and S'b, which are connected in series with each other, form pairs, in which a total of two pairs of upper and lower arm switching devices are connected in parallel (Sa & S'a and Sb & S'b) with each other. A diode may be connected in inverse parallel to each switching devices Sa, S'a, Sb and S'b.

The switching devices Sa, S'a, Sb and S'b in the inverter unit 540 may be turned on and off based on an inverter switching control signal from the controller 550. As a result, AC power having a predetermined frequency may be output, in which it is desired that AC power has the same frequency (about 60 Hz or 50 Hz) as an AC frequency of the grid.

The capacitor C may be interposed between the converter unit 530 and the inverter unit 540.

The capacitor C may store the level-converted DC power of the converter unit 530. Both ends of the capacitor C may be referred to as DC ends, and accordingly, the capacitor may be referred to as a DC end capacitor.

The input current detector A may detect the input current ic1 supplied from the solar cell module 100 to the capacitor unit 520.

The input voltage detector B may detect the input voltage vc1 supplied from the solar cell module 100 to the capacitor unit 520. Here, the input voltage vc1 may be the same as the voltage stored on both ends of the capacitor unit 520.

The detected input current ic1 and input voltage vc1 may be input to the controller 550.

The converter output current detector C detects a current ic2, i.e., DC end current, which is output from the converter unit 530, and the converter output voltage detector D detects a voltage vc2, i.e., DC end voltage, which is output from the converter unit 530. The detected output current i2 and output voltage vc2 may be input to the controller 550.

An inverter output current detector E detects current ic3 output from the inverter unit 540, and an inverter output voltage detector E detects voltage vc3 output from the inverter unit 540. The detected output current ic3 and output voltage vc3 may be input to the controller 550.

The controller 550 may output a control signal to control the switching device S1 of the converter unit 530. Specifically, the controller 550 may output a turn-on timing signal of the switching device S1 in the converter unit 530 based on at least one of the following: the detected input current ic1, input voltage vc1, output current ic2, output voltage vc2, output current ic3, and output voltage vc3.

Further, the controller 550 may output an inverter control signal to control the respective switching devices Sa, S'a, Sb, and S'b of the inverter unit 540. Specifically, the controller 550 may output a turn-on timing signal of the switching devices Sa, S'a, Sb, and S'b of the inverter unit 540 based on at least one of the following: the detected input current ic1, input voltage vc1, output current ic2, output voltage vc2, output current ic3, and output voltage vc3.

In addition, the controller 550 may calculate the maximum power point of the solar cell module 100 and control the converter unit 530 to output DC voltage corresponding to the maximum power.

The communication unit 580 may communicate with an external photovoltaic module.

For example, in the instance where a photovoltaic module is set as a master, the communication unit 580 may output, through power line communication, at least one of phase information or amplitude information for adjusting the phase or amplitude of other photovoltaic module.

Further, in the instance where a photovoltaic module is set as a master, the communication unit 580 may receive, through power line communication, current information and voltage information of other photovoltaic module, and may output to the other photovoltaic module at least one of phase information or amplitude information.

In the instance where a photovoltaic module is set as a master, the controller 550 may control at least one of the phase information or the amplitude information to be output for adjusting the phase or amplitude of other photovoltaic module 50.

In the instance where a photovoltaic module is set as a slave, the controller 550 may control at least one of the phase or amplitude of output AC power to be shifted based on at least one of phase information or amplitude information received from an external source.

Further, in the instance where the current or voltage, output from the converter unit 530, is lower than a reference lower limit level or higher than a reference upper limit level, the controller 550 may output an operation-off command to the inverter unit 540.

In addition, in the instance where the current or voltage, output from the converter unit 530 is between a reference lower limit level and a reference upper limit level, the controller 550 may output an operation-on instruction to the inverter unit 540.

Figure 12:
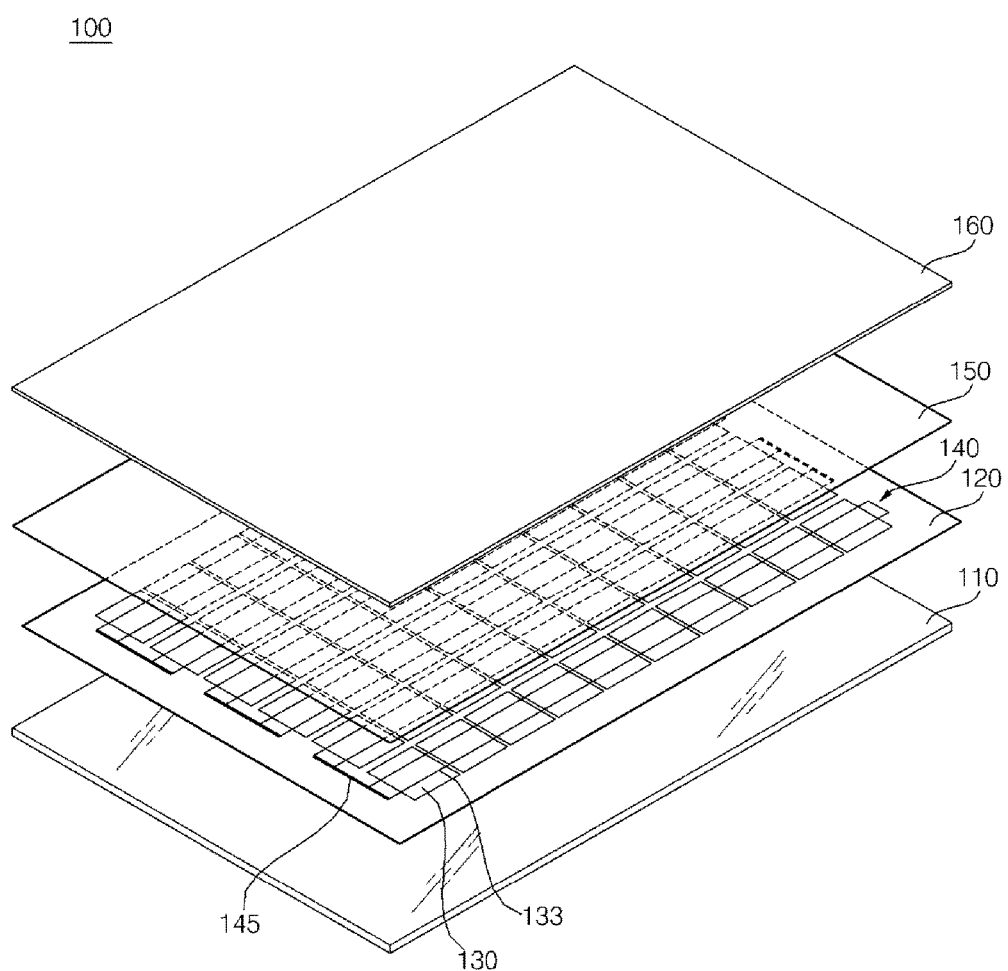
FIG. 12 is an exploded perspective view of a solar cell module illustrated in FIG. 9.

FIG. 12 is an exploded perspective view of the solar cell module illustrated in FIG. 9.

Referring to FIG. 12, the solar cell module 100 comprises a plurality of solar cells 130. In addition, the solar cell module 100 may further comprise a first sealing member 120 disposed at a lower surface of each of the solar cells 130, a second sealing member 150 disposed at an upper surface of each of the solar cells 130, a rear substrate 110 disposed at a lower surface of the first sealing member 120, and a front substrate 160 disposed at an upper surface of the second sealing member 150.

Each of the solar cells 130 is a semiconductor device to convert solar energy into electrical energy, and examples thereof comprise a silicon solar cell, a compound semiconductor solar cell, a tandem solar cell, a dye-sensitized solar cell, a CdTe solar cell, a CIGS solar cell, a thin-film solar cell, and the like.

Each of the solar cells 130 has a light receiving surface, on which sunlight is incident, and a back surface which is opposite the light receiving surface. For example, the solar cell 130 comprises: a first conductive type silicon substrate, a second conductive type semiconductor layer formed on the silicon substrate, the second conductive type being opposite to the first conductive type, at least one or more openings through which a portion of the second conductive type semiconductor layer is exposed, an anti-reflection film formed on the second conductive type semiconductor layer, a front electrode which contacts the portion of the second conductive type semiconductor layer exposed through the at least one or more openings, and a rear electrode formed at the rear surface of the silicon substrate.

Each of the solar cells 130 may be electrically connected in series or in parallel, or connected in a serial-parallel manner. Specifically, the plurality of solar cells 130 may be electrically connected to each other via ribbons 133. Each of the ribbons 133 may be bonded to the front electrode formed on the light receiving surface of one of the solar cells 130 and the rear electrode formed on the back surface of another adjacent one of the solar cells.

In FIG. 12, the ribbons 133 are arranged in two rows and the plurality of solar cells 130 are connected in a line by the ribbons 133 to form one solar cell string 140.

In this manner, as illustrated in FIG. 9, six solar cell strings 140*a*, 140*b*, 140*c*, 140*d*, 140*e*, and 140*f* are formed, each of which comprises ten solar cells.

The rear substrate 110 is a back sheet having waterproof, insulation, and ultraviolet protection functions, and may be a Tedlar/PET/Tedlar (TPT) type substrate, but is not limited thereto. Further, FIG. 11 illustrates an example where the rear substrate 110 is formed in a rectangular shape, but the rear substrate 110 is not limited thereto, and may be formed in various shapes, such as a circular shape and a semi-circular shape, depending on the environment where the solar cell module 100 is installed.

The first sealing member 120 may be attached to the rear substrate 110, with the size of the first sealing member 120 being the same as the size of the rear substrate 110, and the plurality of solar cells 130 may be arranged on the first sealing member 120, with the solar cells 130 being adjacent to each other to form several lines.

The second sealing member 150, which is disposed on the solar cell 130, may be bonded to the first sealing member 120 by lamination Here, the first sealing member 120 and the second sealing member 150 enable elements of the solar cell to be chemically combined, and examples thereof comprise Ethylene Vinyl Acetate (EVA) film, and the like.

The front substrate 160 may be disposed on the second sealing member 150 for sunlight transmission, and it is desired that the front substrate 160 is made of reinforced glass to protect the solar cells 130 from external impact. Further, it is further desired that the front substrate 160 may be made of low-iron reinforced glass to prevent reflection of sunlight and to increase transmittance of sunlight.

As is apparent from the above description, according to an embodiment of the present invention, the photovoltaic module comprises a solar cell module, a converter unit to convert direct current (DC) power from the solar cell module, an inverter unit to convert the DC power into alternating current (AC) power, a cable electrically connected to the inverter unit and to output the AC power to the outside, a communication unit to exchange data with other photovoltaic module, and a controller to control outputting of at least one of phase information or amplitude information of the photovoltaic module for adjusting a phase or amplitude of the other photovoltaic module, when the photovoltaic module is set as a master. In this manner, the phase or amplitude of AC power output from the other photovoltaic module may be adjusted to be equal.

The photovoltaic module may further comprise an outlet, which is electrically connected to the cable, and to which a plug of a home appliance is capable of being connected, such that AC power may be directly supplied to the home appliance independently of a grid.

In addition, the photovoltaic module may further comprise an operation unit to set a photovoltaic module as a master or a slave, thereby enabling the photovoltaic module to be simply set as a master or a slave.

According to an example embodiment of the present invention, the photovoltaic system comprises a plurality of photovoltaic modules, each comprising a solar cell module, and an inverter unit to convert direct current (DC) power of the solar cell module into alternating current (AC) power and output the AC power, and a plurality of cables, each electrically connected to the plurality of photovoltaic modules, and to output the AC power to the outside, wherein in response to a first photovoltaic module, among the plurality of photovoltaic modules, being set as a master, the first photovoltaic module outputs at least one of phase information or amplitude information for adjusting a phase or amplitude of other photovoltaic modules. In this manner, based on the first photovoltaic module, the phase or amplitude of AC power output from the other photovoltaic modules may be adjusted to be equal.

The photovoltaic system may further comprise an outlet, which is electrically connected to the plurality of cables, and to which a plug of a home appliance is capable of being connected, such that AC power may be directly supplied to the home appliance independently of a grid.

The photovoltaic module and the photovoltaic system comprising the same are not limited to the configuration and method of the above-described embodiments, and all or some of the above embodiments may be selectively combined with each other to enable various modifications thereof.

While the present invention has been shown and described with reference to the example embodiments thereof, it should be understood that the present invention is not limited to the specific embodiments, and various modifications and variations may be made by those skilled in the art without departing from the scope and spirit of the invention as defined by the appended claims, and the modified implementations should not be construed independently of the technical idea or prospect of the present invention.

What is claimed is:

1. A photovoltaic module comprising:
   a solar cell module;
   a converter unit configured to convert levels of direct current (DC) power from the solar cell module;
   an inverter unit configured to convert the DC power into alternating current (AC) power;

a cable electrically connected to the inverter unit and to output the AC power to an outside;

a communication unit configured to exchange data with another photovoltaic module; and a controller configured to control outputting of at least one of phase information and amplitude information of the photovoltaic module for adjusting at least one of a phase and an amplitude of AC power of another photovoltaic module, when the photovoltaic module is set as a master, wherein in response to current or voltage output from the converter unit being lower than a reference lower limit level or higher than a reference upper limit level, the controller outputs an operation-off command to the inverter unit, wherein in response to the operation-off command, the inverter unit stops a switching operation, and wherein when the photovoltaic module is set as the master, the operation-off command is transmitted to another photovoltaic module through the communication unit.

2. The photovoltaic module of claim 1, further comprising an outlet which is electrically connected to the cable, and to which a plug of an electric device is capable of being connected.

3. The photovoltaic module of claim 1, wherein, when the photovoltaic module is set as the master, the controller controls the photovoltaic module to shift at least one of a phase or an amplitude of the output AC power, based on at least one of phase information or amplitude information received from an external source.

4. The photovoltaic module of claim 1, further comprising an operation unit configured to set the photovoltaic module as the master or a slave.

5. The photovoltaic module of claim 4, wherein the communication unit receives current information and voltage information of another photovoltaic module, and outputs at least one of the phase information or the amplitude information to another photovoltaic module.

6. The photovoltaic module of claim 1, wherein the photovoltaic module further comprises:

a converter output current detector configured to detect a current output from the converter unit; and a converter output voltage detector configured to detect a voltage output from the converter unit.

7. The photovoltaic module of claim 1, further comprising a phase shifting unit configured to change a phase of the output AC power based on a phase changing signal received through the communication unit and generated by a gateway or another photovoltaic module.

8. The photovoltaic module of claim 7, wherein the phase shifting unit comprises:

a capacitor;

a first switching device connected in series with the capacitor;

an inductor connected in parallel with the capacitor or the first switching device; and a second switching device connected in series with the inductor.

9. The photovoltaic module of claim 8, wherein, based on a phase advancing signal received from the gateway or another photovoltaic module, the controller controls the first switching device to be turned on and the second switching device to be turned off.

10. The photovoltaic module of claim 8, wherein, based on a phase delay signal received from the gateway or another photovoltaic module, the controller controls the first switching device to be turned off and the second switching device to be turned on.

11. A photovoltaic system comprising:

a plurality of photovoltaic modules, each comprising a solar cell module, and an inverter unit configured to convert direct current (DC) power of the solar cell module into alternating current (AC) power and output the AC power; and a plurality of cables, each electrically connected to the plurality of photovoltaic modules, and configured to output the AC power to an outside, wherein in response to a first photovoltaic module, among the plurality of photovoltaic modules, being set as a master, the first photovoltaic module outputs at least one of phase information and amplitude information for adjusting at least one of a phase and an amplitude of another photovoltaic module, wherein the first photovoltaic module further comprises:

a communication unit configured to output at least one of the phase information or the amplitude information to the outside;

a converter unit configured to convert a level of DC current power from the solar cell module; and a controller configured to control the converter unit and the inverter unit, wherein in response to current or voltage output from the converter unit being lower than a reference lower limit level or higher than a reference upper limit level, the controller outputs an operation-off command to the inverter unit, wherein in response to the operation-off command, the inverter unit stops a switching operation, and wherein when the first photovoltaic module is set as the master, the operation-off command is transmitted to another photovoltaic module through the communication unit.

12. The photovoltaic system of claim 11, further comprising an outlet which is electrically connected to the plurality of cables, and to which a plug of an electric device is capable of being connected.

13. The photovoltaic system of claim 11, wherein, in response to a second photovoltaic module, among the plurality of photovoltaic modules, being set as a slave, the second photovoltaic module changes at least one of a phase or an amplitude of the output AC power, based on at least one of the phase information or the amplitude information received from the first photovoltaic module.

14. The photovoltaic system of claim 11, wherein the first photovoltaic module further comprises:

an operation unit configured to set the photovoltaic module as a master or a slave.

15. The photovoltaic system of claim 1, wherein the communication unit of the first photovoltaic module receives current information and voltage information of another photovoltaic module, and outputs at least one of the phase information or the amplitude information to another photovoltaic module.

16. The photovoltaic system of claim 11, wherein the first photovoltaic module further comprises:

a converter output current detector configured to detect current output from the converter unit; and a converter output voltage detector configured to detect voltage output from the converter unit.

17. The photovoltaic system of claim 11, wherein the photovoltaic module further comprises a phase shifting unit configured to change a phase of the output AC power based on a phase changing signal received through the communication unit and generated by a gateway or another photovoltaic module.

18. The photovoltaic system of claim 17, wherein the phase shifting unit comprises:
   a capacitor;
   a first switching device connected in series with the capacitor;
   an inductor connected in parallel with the capacitor or the first switching device; and
   a second switching device connected in series with the inductor.

19. The photovoltaic system of claim 18, wherein, based on a phase advancing signal received from the gateway or another photovoltaic module, the controller controls the first switching device to be turned on and the second switching device to be turned off.

20. The photovoltaic system of claim 18, wherein, based on a phase delay signal received from the gateway or another photovoltaic module, the controller controls the first switching device to be turned off and the second switching device to be turned on.

* * * * *